United States Patent
Lo et al.

(10) Patent No.: US 8,780,437 B1
(45) Date of Patent: Jul. 15, 2014

(54) ELECTROPHORETIC DISPLAY APPARATUS

(71) Applicant: E Ink Holdings Inc., Hsinchu (TW)

(72) Inventors: Po-Yuan Lo, Hsinchu (TW); Tai-Yuan Lee, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 14/060,579

(22) Filed: Oct. 22, 2013

(30) Foreign Application Priority Data

Jan. 24, 2013 (TW) .............................. 102102699 A

(51) Int. Cl.
*G02B 26/00* (2006.01)
*G09G 3/34* (2006.01)

(52) U.S. Cl.
USPC .......................................... 359/296; 345/107

(58) Field of Classification Search
USPC ............. 359/296; 345/84, 107, 173; 349/106, 349/149
See application file for complete search history.

(56) References Cited

U.S. PATENT DOCUMENTS

| | | | |
|---|---|---|---|
| 6,992,737 B2 * | 1/2006 | Kaneko et al. ................ 349/106 |
| 7,532,295 B2 * | 5/2009 | Murade ......................... 349/151 |
| 7,701,533 B2 | 4/2010 | Kobayashi et al. |
| 7,864,271 B2 | 1/2011 | Nakamura et al. |
| 8,179,365 B2 * | 5/2012 | Lee et al. ...................... 345/107 |
| 8,253,135 B2 * | 8/2012 | Uochi et al. .................... 257/43 |
| 8,284,353 B2 * | 10/2012 | Huang et al. ................. 349/106 |
| 2006/0186913 A1 | 8/2006 | Kim |
| 2007/0063946 A1 | 3/2007 | Nakamura et al. |
| 2007/0064178 A1 | 3/2007 | Murai |
| 2007/0064302 A1 | 3/2007 | Johnson et al. |

* cited by examiner

*Primary Examiner* — Loha Ben
(74) *Attorney, Agent, or Firm* — Jianq Chyun IP Office

(57) ABSTRACT

An electrophoretic display apparatus includes a drive array substrate, a color filter layer and an electrophoretic display film. The drive array substrate has a plurality of pixel units, in which each of the pixel units includes a drive device. The color filter layer is disposed on the drive array substrate and has a plurality of color filter patterns, in which each of the color filter patterns is corresponding to at least two of the pixel units. The electrophoretic display film is disposed between the drive array substrate and the color filter layer and includes a plurality of display mediums, in which the display mediums corresponding to each of the color filter patterns are controlled by at least two of the drive devices.

10 Claims, 3 Drawing Sheets

ELECTROPHORETIC DISPLAY APPARATUS

CROSS-REFERENCE TO RELATED APPLICATION

This application claims the priority benefit of Taiwan application serial no. 102102699, filed on Jan. 24, 2013. The entirety of the above-mentioned patent application is hereby incorporated by reference herein and made a part of this specification.

BACKGROUND OF THE INVENTION

1. Field of the Invention

The invention generally relates to a display apparatus, and more particularly, to an electrophoretic display apparatus.

2. Description of Related Art

The electronic paper (e-paper) and the e-book use electrophoretic display technique to achieve the purpose of displaying. Taking the monochrome e-book as an example, the display medium thereof is constituted mainly by black electrophoretic liquid and white charged particles doped in the black electrophoretic liquid, where the white charged particles can migrate by applying a voltage so that each pixel can respectively display black color, white color or grayscale.

In the current technique, most of the electrophoretic displays achieve the purpose of displaying by using the reflection of an external light source, where each pixel can respectively display the required grayscale through driving the white charged particles in the electrophoretic liquid by applying a voltage. In addition, in order to expand the application of the electrophoretic display, a color filter film is employed and disposed on the electrophoretic display film. At the time, the presented color of the electrophoretic display apparatus is achieved mainly by using the ambient light, which penetrates the color filter film, and then, after reflecting the ambient light by the white charged particles in the electrophoretic liquid, the reflected light penetrates the color filter film again for displaying.

In general, the color filter layer mainly consists of a plurality of filter patterns with different colors, and each of the filter patterns with different colors is respectively corresponding to a pixel unit on the drive array substrate. When a single pixel unit is driven, the human naked eyes would have a perception of color bias at the boundaries between two adjacent filter patterns due to different angle of viewings (AOVs). To overcome the above-mentioned problem in the prior art, a black matrix is disposed to partition each filter pattern from the others so as to reduce the color bias problem. However, the above-mentioned measure will cause a relatively smaller light transmittance rate by the black matrix.

SUMMARY OF THE INVENTION

Accordingly, the invention is directed to an electrophoretic display apparatus able to improve the display quality varied with changing angle of viewing (AOV).

An electrophoretic display apparatus of the invention includes a drive array substrate, a color filter layer and an electrophoretic display film. The drive array substrate has a plurality of pixel units, in which each of the pixel units includes a drive device. The color filter layer is disposed on the drive array substrate and has a plurality of color filter patterns, in which each of the color filter patterns corresponds to at least two of the pixel units. The electrophoretic display film is disposed between the drive array substrate and the color filter layer and includes a plurality of display mediums, in which the display mediums corresponding to each of the color filter patterns are controlled by at least two of the drive devices.

In an embodiment of the invention, the electrophoretic display film further includes a flexible substrate and a common electrode. The flexible substrate is disposed between the color filter layer and the display mediums, and the common electrode is disposed on the flexible substrate and located between the flexible substrate and the display mediums.

In an embodiment of the invention, each of the display mediums includes an electrophoretic liquid, a plurality of black charged particles and a plurality of white charged particles, and the black charged particles and the white charged particles are distributed in the electrophoretic liquid.

In an embodiment of the invention, each of the display mediums includes an electrophoretic liquid, a plurality of black charged particles, a plurality of white charged particles and a micro-cups structure, and the micro-cups structure is filled with the electrophoretic liquid, the black charged particles and the white charged particles therein.

In an embodiment of the invention, the color filter patterns include at least one red filter pattern, at least one blue filter pattern and at least one green filter pattern.

In an embodiment of the invention, the color filter patterns include at least one red filter pattern, at least one blue filter pattern, at least one green filter pattern and at least one white filter pattern.

In an embodiment of the invention, the area of each of the color filter patterns is between 50 micrometers and 10000 micrometers.

In an embodiment of the invention, the drive devices of the pixel units corresponding to each of the color filter patterns are arranged in array.

In an embodiment of the invention, the drive device includes a thin film transistor (TFT).

In an embodiment of the invention, the TFT includes top-gate TFT or bottom gate TFT.

Based on the description above, since each of the color filter patterns of the invention is corresponding to at least two pixel units and the display mediums corresponding to each of the color filter patterns are controlled by at least two drive devices, so that by turning on and turning off the drive devices, the color of a single color filter pattern presents with grayscale. In this way, the invention can reduce the color bias problem at boundaries between two adjacent color filter patterns due to different angles of viewing (AOVs). In short, the design of the electrophoretic display apparatus in the invention can improve the display quality varied with changing the AOV.

In order to make the features and advantages of the present invention more comprehensible, the present invention is further described in detail in the following with reference to the embodiments and the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
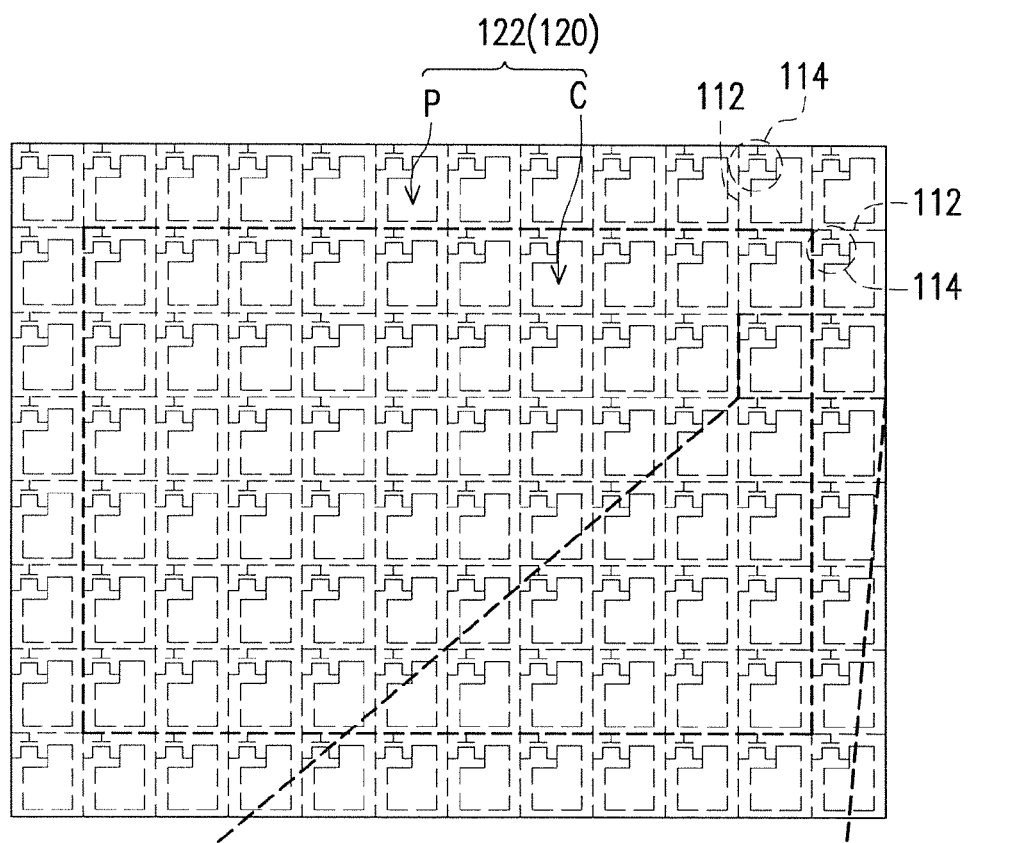
FIG. 1A is a partial top-view diagram of an electrophoretic display apparatus according to an embodiment of the invention.
Figure 1B:
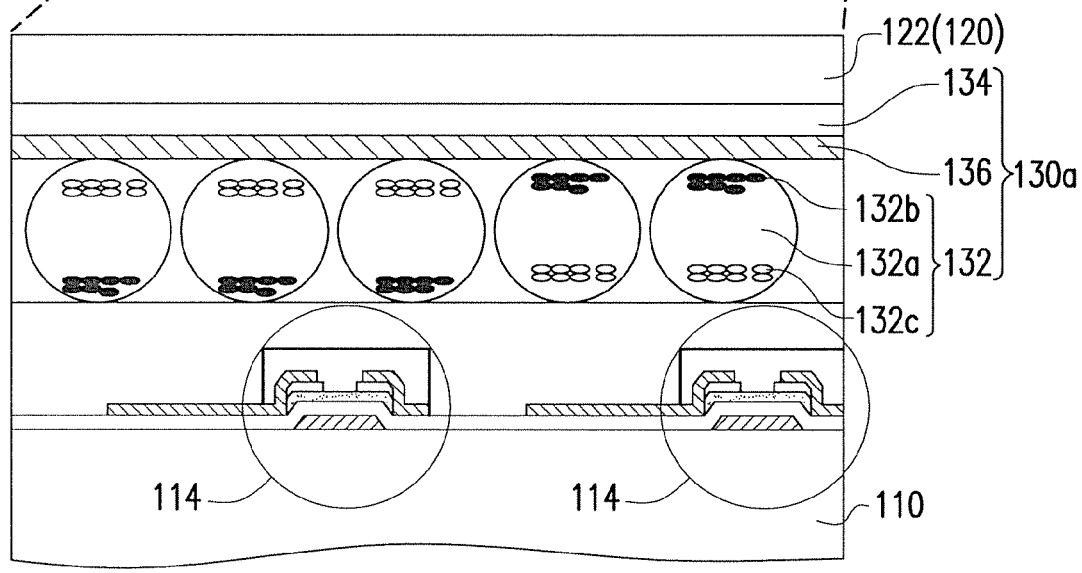
FIG. 1B is a partial cross-sectional diagram of the electrophoretic display apparatus of FIG. 1A.

FIG. 1A is a partial top-view diagram of an electrophoretic display apparatus according to an embodiment of the invention and FIG. 1B is a partial cross-sectional diagram of the electrophoretic display apparatus of FIG. 1A. For convenience, some elements in FIG. 1A are omitted. Referring to FIGS. 1A and 1B, in the embodiment, an electrophoretic display apparatus 100a includes a drive array substrate 110, a color filter layer 120 and an electrophoretic display film 130a. The drive array substrate 110 has a plurality of pixel units 112, in which each of the pixel units 112 includes a drive device 114. The color filter layer 120 is disposed on the drive array substrate 110 and has a plurality of color filter patterns 122. Each of the color filter patterns 122 corresponds to at least two pixel units 112. The electrophoretic display film 130a is disposed between the drive array substrate 110 and the color filter layer 120 and includes a plurality of display mediums 132, in which the display mediums 132 corresponding to each of the color filter patterns 122 are controlled by at least two of the drive devices 114.

In more details, in the embodiment, the drive array substrate 110 is, for example, a TFT array substrate and the drive device 114 is a TFT and the TFT is, as shown by FIG. 1B, a bottom-gate TFT. In other unshown embodiments however, the drive device 114 can be a top-gate TFT as well, which the invention is not limited to. The electrophoretic display film 130a in the embodiment further includes a flexible substrate 134 and a common electrode 136, in which the flexible substrate 134 is disposed between the color filter layer 120 and the display mediums 132, while the common electrode 136 is disposed on the flexible substrate 134 and located between the flexible substrate 134 and the display mediums 132. The material of the flexible substrate 134 is, for example, polyethylene tetrephthalate (PET). Each of the display mediums 132 herein includes an electrophoretic liquid 132a, a plurality of black charged particles 132b and a plurality of white charged particles 132c as shown by FIG. 1B. The black charged particles 132b and the white charged particles 132c are distributed in the electrophoretic liquid 132a.

Figure 1C:
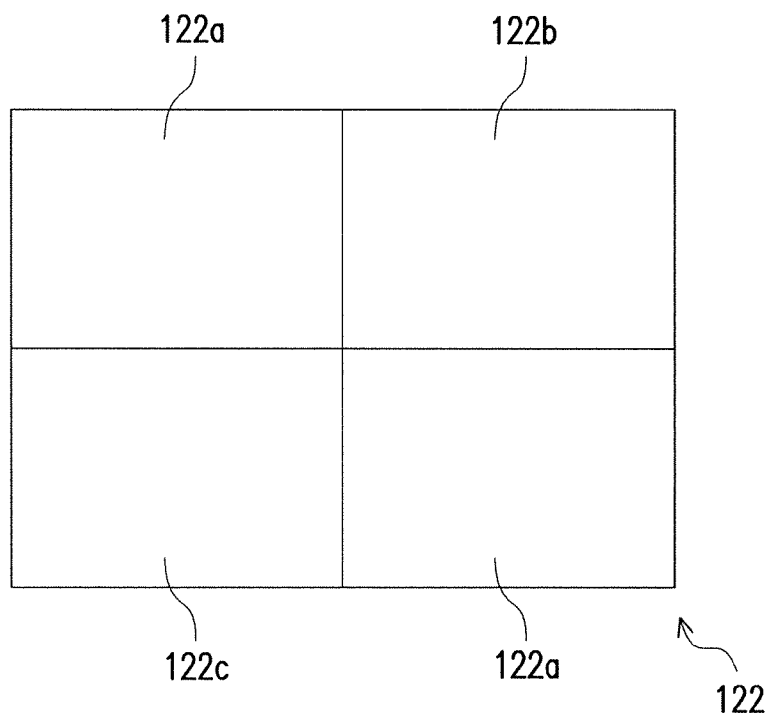
FIGS. 1C and 1D are partial top-view diagrams respectively showing the color filter layer of the electrophoretic display apparatus in FIG. 1A according to two embodiments of the invention.
Figure 1D:
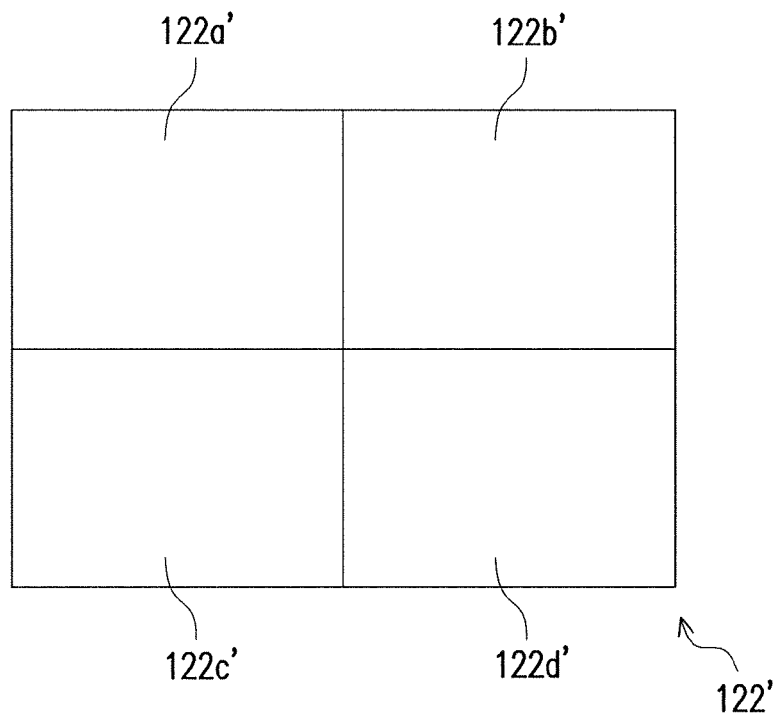

As shown by FIG. 1C, each of the color filter patterns 122 of the embodiment is composed of at least one red filter pattern 122a (two ones are shown in FIG. 1C), at least one blue filter pattern 122b (one is shown in FIG. 1C) and at least one green filter pattern 122c (one is shown in FIG. 1C). In other embodiments, referring to FIG. 1D, the color filter patterns 122' can be composed of at least one red filter pattern 122a' (one is shown in FIG. 1D), at least one blue filter pattern 122b' (one is shown in FIG. 1D), at least one green filter pattern 122c' (one is shown in FIG. 1D) and at least one white filter pattern 122d' (one is shown in FIG. 1D). All the above-mentioned designs belong to the technical schemes adopted by the invention without departing from the protected scope of the invention. The area of each of the color filter patterns 122 herein is between 50 micrometers and 10000 micrometers and the drive devices 114 of the pixel units 112 corresponding to each of the color filter patterns 122 are arranged in an array.

Figure 2:
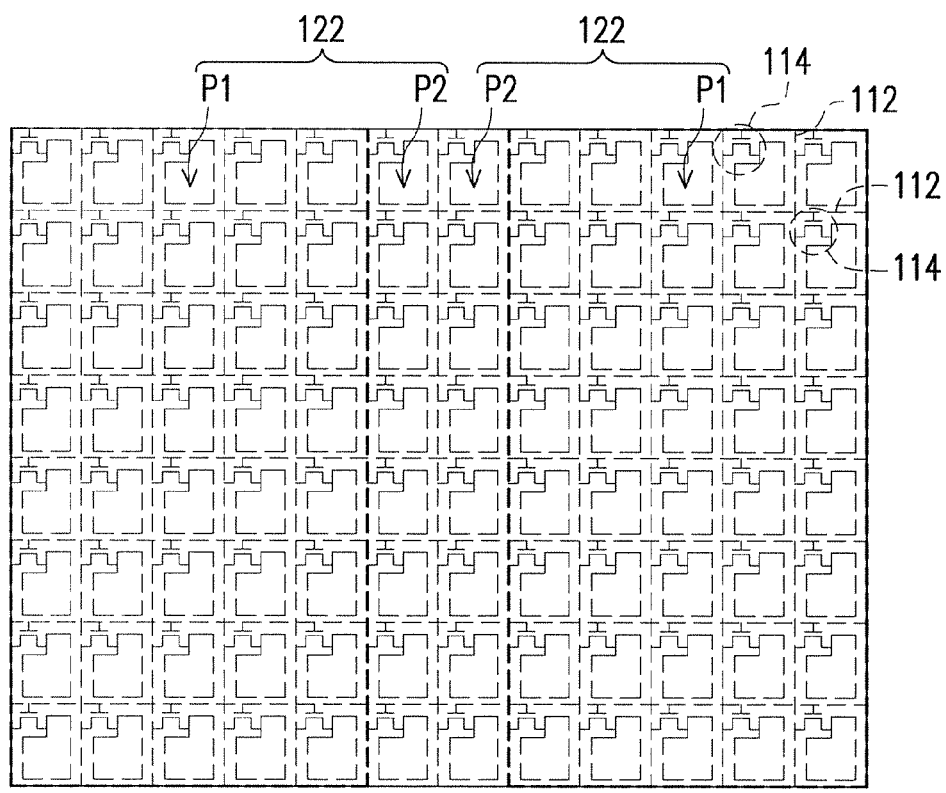
FIG. 2 is a partial top-view diagram of a plurality of pixel units corresponding to a single color filter pattern according to an embodiment of the invention.

Referring to FIG. 1A, for example, when all the drive devices 114 within the central areas C corresponding to a single color filter pattern 122 are in turning on state and all the drive devices 114 within the peripheral areas P corresponding to a single color filter pattern 122 are in turning-off state, at the time, the color of the single color filter pattern 122 presents with grayscale coming with a bright central portion and dark surrounding portions. In this way, the invention can overcome the color bias problem due to different AOVs at the boundaries between two adjacent color filter patterns 122. In other embodiments, referring to FIG. 2, it can be all the drive devices 114 within the first areas P1 corresponding to a single color filter pattern 122 are in turning on state and all the drive devices 114 within the second areas P2 corresponding to a single color filter pattern 122 are in turning off state. At the time, the color of the single color filter pattern 122 presents with grayscale coming with the bright first areas P1 and the dark second areas P2 (the second areas P2 are respectively adjacent to a side of another color filter pattern 122). In addition, in other unshown embodiments, any people of the art can refer to the description of the above-mentioned embodiment and according to the real requirement make all the drive devices 114 corresponding to a single color filter pattern 122 in turning on state or in turning off state by design so as to achieve the required effect.

Since every color filter pattern 122 in the embodiment is corresponding to at least two pixel units 112 and the display mediums 132 corresponding to each the color filter pattern 122 are controlled by at least two drive devices 114, the color of a single color filter pattern 122 can present with grayscale by turning on/off the drive devices 114. Thus, the invention can reduce the color bias problem at boundaries between two adjacent color filter patterns due to different AOVs. In short, the design of the electrophoretic display apparatus 100a in the embodiment can improve the display quality varied with changing angle of viewing (AOV).

Figure 3:
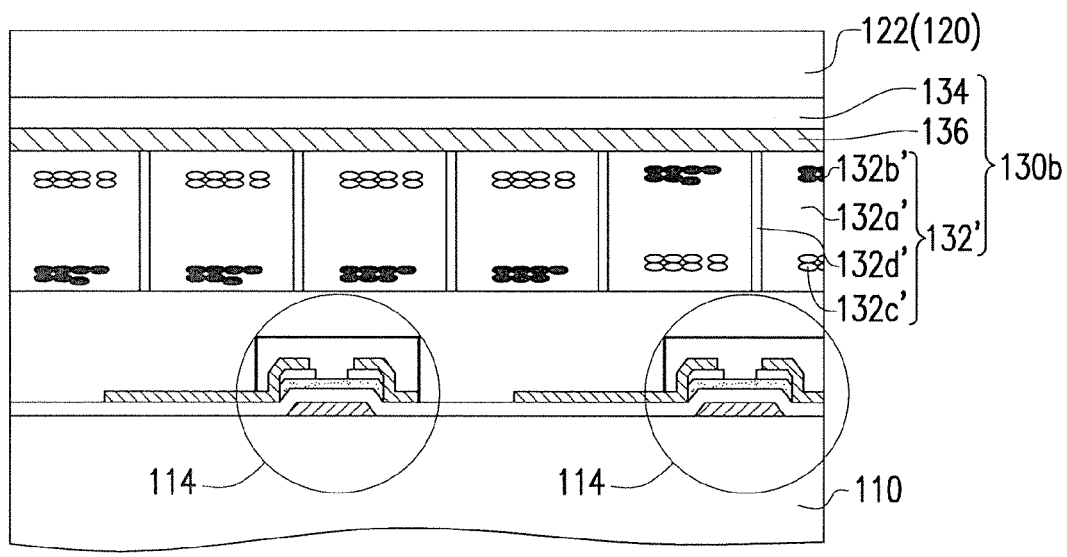
FIG. 3 is a partial cross-sectional diagram of an electrophoretic display apparatus according to another embodiment of the invention.

It should be noted that the invention does not limit the composition of the display medium 132 of the electrophoretic display film 130a. All though each of the above-mentioned display mediums 132 is composed of an electrophoretic liquid 132a, black charged particles 132b and white charged particles 132c, but in other embodiments, referring to FIG. 3, each display medium 132' of the electrophoretic display film 130b in an electrophoretic display apparatus 100b can include an electrophoretic liquid 132a', a plurality of black charged particles 132b', a plurality of white charged particles 132c' and a micro-cups structure 132d', in which the micro-cups structure 132d' is filled with the electrophoretic liquid 132a', the black charged particles 132b' and the white charged particles 132c', which still belongs to the technical schemes adopted by the invention without departing from the protected scope of the invention.

In summary, since each of the color filter patterns of the invention corresponds to at least two pixel units, and the display mediums corresponding to each of the color filter patterns are controlled by at least two drive devices, so that by turning on and off the drive devices, the color of a single color filter pattern presents with grayscale. In this way, the invention can reduce the color bias problem at boundaries between two adjacent color filter patterns due to different angles of viewing (AOVs). In short, the design of the electrophoretic display apparatus in the invention can improve the display quality varied with changing the AOV.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An electrophoretic display apparatus, comprising:
   a drive array substrate, having a plurality of pixel units, wherein each of the pixel units comprises a drive device;
   a color filter layer, disposed on the drive array substrate and having a plurality of color filter patterns, wherein each of the color filter patterns corresponds to at least two of the pixel units; and
   an electrophoretic display film, disposed between the drive array substrate and the color filter layer and comprising a plurality of display mediums, wherein the display mediums corresponding to each of the color filter patterns are controlled by at least two of the drive devices.

2. The electrophoretic display apparatus as claimed in claim 1, wherein the electrophoretic display film further comprises:
   a flexible substrate, disposed between the color filter layer and the display mediums; and
   a common electrode, disposed on the flexible substrate and located between the flexible substrate and the display mediums.

3. The electrophoretic display apparatus as claimed in claim 1, wherein each of the display mediums comprises an electrophoretic liquid, a plurality of black charged particles and a plurality of white charged particles, and the black charged particles and the white charged particles are distributed in the electrophoretic liquid.

4. The electrophoretic display apparatus as claimed in claim 1, wherein each of the display mediums comprises an electrophoretic liquid, a plurality of black charged particles, a plurality of white charged particles and a micro-cups structure, and the micro-cups structure is filled with the electrophoretic liquid, the black charged particles and the white charged particles therein.

5. The electrophoretic display apparatus as claimed in claim 1, wherein the color filter patterns comprise at least one red filter pattern, at least one blue filter pattern and at least one green filter pattern.

6. The electrophoretic display apparatus as claimed in claim 1, wherein the color filter patterns comprise at least one red filter pattern, at least one blue filter pattern, at least one green filter pattern and at least one white filter pattern.

7. The electrophoretic display apparatus as claimed in claim 1, wherein an area of each of the color filter patterns is between 50 micrometers and 10000 micrometers.

8. The electrophoretic display apparatus as claimed in claim 1, wherein the drive devices of the pixel units corresponding to each of the color filter patterns are arranged in an array.

9. The electrophoretic display apparatus as claimed in claim 1, wherein the drive device of each pixel unit comprises a thin film transistor.

10. The electrophoretic display apparatus as claimed in claim 9, wherein the thin film transistor comprises a top-gate thin film transistor or a bottom-gate thin film transistor.

* * * * *